N. W. DALTON.
LANDING GEAR CONSTRUCTION.
APPLICATION FILED MAY 14, 1917.

1,290,102.

Patented Jan. 7, 1919.

Inventor
NELSON W. DALTON.

By

Attorney

UNITED STATES PATENT OFFICE.

NELSON W. DALTON, OF BUFFALO, NEW YORK, ASSIGNOR TO CURTISS AEROPLANE AND MOTOR CORPORATION, A CORPORATION OF NEW YORK.

LANDING-GEAR CONSTRUCTION.

1,290,102.   Specification of Letters Patent.   Patented Jan. 7, 1919.

Application filed May 14, 1917.   Serial No. 168,565.

*To all whom it may concern:*

Be it known that I, NELSON W. DALTON, a citizen of the United States, residing at Buffalo, in the county of Erie and State of New York, have invented certain new and useful Improvements in Landing-Gear Construction, of which the following is a specification.

My invention relates to landing gear construction and more particularly to improvements in landing gear struts *per se.* The conventional V-type landing gear, in its ensemble, comprises an axle, wheels, shock absorber elastics, fittings, fairing, and opposed substantially V-arranged struts. The legs of the V-arranged struts engage in the fittings and the shock absorber elastics with the under (angular) surface thereof. The axle is carried by the V-struts and is fastened thereto by the shock absorber elastics. The wheels are mounted upon the axle extremities and the fairing streamlines the axle and sometimes functions conjointly as a strut brace. Although strong, light, and serviceable, a landing gear thus constructed can be improved. The contact between the shock absorber elastics and the angular metal fittings is such that the elastics wear unnecessarily and ofttimes to such an extent as to render the landing gear in its entirety unsafe. The fittings are bulky and costly and during flight offer considerable head resistance or drag. Moreover, the landing gear strut, by its three part construction is weakened appreciably at the very point where maximum strength is required. Such objectionable characteristics are eliminated by the invention hereinafter disclosed. Instead of constructing the strut proper of connected parts, a one piece metallic tube is used in the construction of each strut. Each tube is bent intermediately in a direction counter to the direction of the strains imposed upon the landing gear and in such manner that the bent portion of the tube constitutes the bight portion of the V. Rounded metal bearing surfaces or anchorages for the shock absorber elastics are accordingly provided. The continuity of the struts from end to end is unbroken. That portion of each strut designed to withstand the direct impact is characterized by increased strength. Furthermore, the production cost, size and bulkiness are materially decreased.

Figure 1:
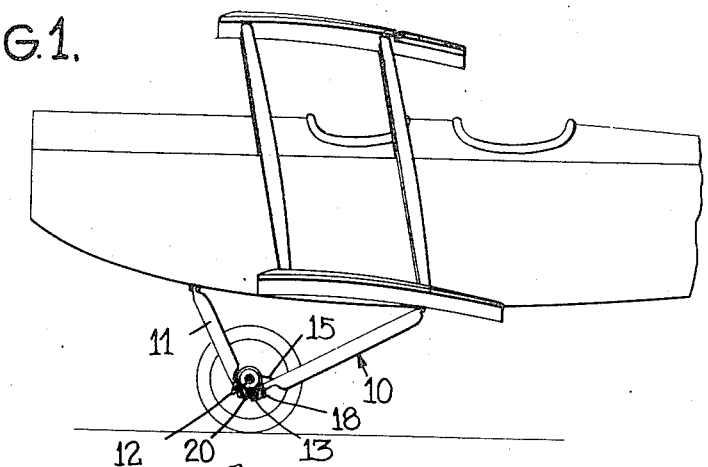
Figure 1 is a side elevation of an aeroplane equipped with the improved landing gear herein disclosed.
Figure 2:
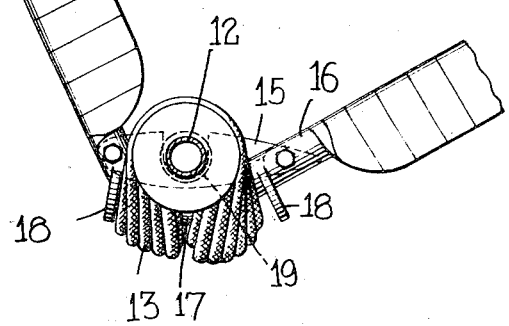
Fig. 2 is an enlarged side elevation of that portion of one of the landing gear struts in the vicinity of its point of intersection with the landing gear axle.
Figure 3:
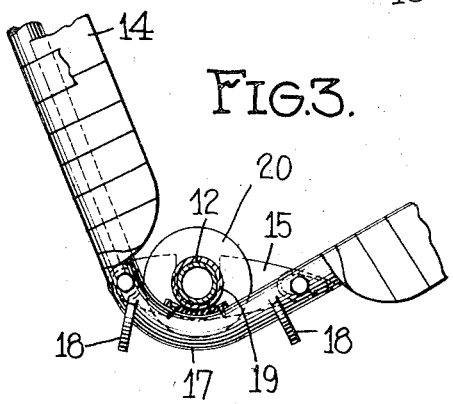
Fig. 3 is a similar view; the shock absorber elastics illustrated in Fig. 2 having been removed.
Figure 4:
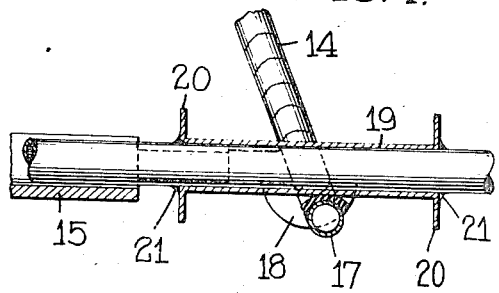
Fig. 4 is a transverse vertical sectional view illustrating the axle mounting.

The landing gear in its entirety is designated as 10. It comprises opposed substantially V-struts 11, a landing gear axle 12, shock absorber elastics 13, strut fairing 14, and axle fairing 15, the latter (see Figs. 2 and 3) being longitudinally pocketed or recessed to receive and inclose the landing gear axle 12. The opposed substantially V-struts 11 are of duplicate construction. Each comprises a metallic tube 16 bent intermediate its ends as at 17 in a direction counter to the direction of the landing strains. Said bent portions 17 constitute the bight portions of the opposed V-struts.

The landing gear axle 12 and the opposed V-struts 11 intersect in the vicinity of the bent portions 17 of the V-struts (see Fig. 3), the plane of the axle being somewhat above the plane of the bight portions of the struts. The axle is fastened to said bight portions by the shock absorber elastics 13 which are grouped at the foot of each strut to twice pass beneath the bight portions of the struts and twice pass above or over the axle. The rounded bearing surfaces afforded by the tubing 16 and the axle 13 are such that the wear and tear upon the elastics is minimized. At each side of the bends in the tubes 16 abutments 18 are provided. These abutments are integrally formed upon the metallic portions of the struts, one upon each side of the axle 12, and in such relation thereto as to receive beneath them the elastics 13. The elastics are in this way held against longitudinal displacement.

To prevent displacement of the axle with respect to the struts and to prevent displacement of the shock absorber elastics longitudinally of the axle, metallic sleeves 19 are provided, one sleeve adjacent each end of the axle at its points of intersection with the respective struts. These sleeves are terminally annularly flanged as at 20 and brazed or welded onto the axle as at 21. The flanges 20 receive between them the elastics 13 which bind or fasten the axle and struts together.

By constructing the substantially V-shaped struts of metal tubing continuous from end to end, the strength of the struts is materially increased and the use of cumbersome fittings at the foot of the landing gear avoided. The angular bearing surfaces which now serve as anchorages for the shock absorber elastics are eliminated. In this way the frictional wear and tear on the elastics is considerably relieved. Also, under the conditions disclosed, maximum strength is provided at the bight portions of the struts and production cost reduced along with a decrease in head resistance.

In using fairing 14 in connection with the metal V-shaped struts, the head resistance is reduced. The fairing, however, unlike the struts, is constructed of separate strips or pieces, one strip of fairing (preferably wood) being provided for each leg of the strut. It is impossible, in this connection, to use a single length of fairing as the trailing edge of the fairing for the forward leg of the V-strut would constitute the leading edge of the rear leg and vice versa. Furthermore, the use of a continuous metal strut of streamline section is impractical as the same objectionable condition would exist. It is for this reason, and the further reason that wood is lighter than metal, that separate strips of material are provided for each leg of the strut.

While in the foregoing there has been illustrated in the drawings and described in the specification such combination and arrangement of elements as constitute the preferred construction or embodiment of this invention, it is nevertheless desired to emphasize the fact that interpretation of the invention should only be conclusive when made in the light of the subjoined claims.

What is claimed is:

1. In an airplane landing gear, the combination with the axle and shock absorber elastics, of a substantially V-shaped metal landing gear strut having its legs and bight portion constructed of a single length of metal tubing of constant cross section bent intermediate its ends to extend beneath the axle and offer a rounded bearing surface for the elastics, together with fairing for the legs of the V-strut formed by attaching thereto separate strips of lighter material, the cross sectional form of the lighter material being such that it constitutes with the metal tubing a landing gear strut, the legs of which are of substantially streamline section.

2. In a landing gear for aeroplanes, opposed substantially V-shaped landing gear struts, each strut having its legs constructed of metal bent intermediate its ends in a direction counter to the direction of the strain imposed upon the strut in landing, the bent portions constituting the bight portions of the opposed struts, an axle having its extremities extended beyond said bight portions, shock absorber elastics for fastening the axle extremities to said bight portions, and abutments formed upon the opposed struts in the vicinity of the bends therein to engage and hold the elastics against displacement.

3. In a landing gear for airplanes, opposed substantially V-shaped landing gear struts, each strut having its legs constructed of metal tubing bent intermediate its ends in a direction counter to the direction of the strain imposed upon the struts in landing, the bent portions constituting the bight portions of the opposed struts, an axle having its extremities extended beyond said bight portions, shock absorber elastics for fastening the axle extremities to said bight portions, and pairs of abutments formed respectively upon the axle and adjacent the bight portion of the struts, the plane of one pair of abutments being at right angles to the plane of the other pair, said abutments preventing displacement of the elastics both laterally and longitudinally with respect to the landing gear.

4. In an airplane landing gear the combination with the axle and shock absorber elastics, of a substantially V-shaped landing gear strut having its legs and bight portion constructed of a single length of metal bent intermediate its ends and provided with abutments for said elastics, the abutments being welded, brazed or otherwise permanently fastened to the struts adjacent its bight portion without the use of independent fastening devices such as fittings, bolts, etc.

In testimony whereof I hereunto affix my signature.

NELSON W. DALTON.

Copies of this patent may be obtained for five cents each, by addressing the "Commissioner of Patents, Washington, D. C."